United States Patent
Oh

[11] Patent Number: 5,995,165
[45] Date of Patent: Nov. 30, 1999

[54] COLOR CORRECTION METHOD AND APPARATUS USING UNEVEN TWO-DIMENSIONAL CHROMATICITY PARTITIONING

[75] Inventor: Chae-gon Oh, Suwon, Rep. of Korea

[73] Assignee: Samsung Electronics Co., Ltd., Kyungki-do, Rep. of Korea

[21] Appl. No.: 08/852,063

[22] Filed: May 6, 1997

[30] Foreign Application Priority Data

May 6, 1996 [KR] Rep. of Korea ...................... 96-14711

[51] Int. Cl.⁶ ............................... H04N 9/67; H04N 1/46
[52] U.S. Cl. ........................ 348/661; 358/517; 358/523
[58] Field of Search .................................. 348/571, 576, 348/577, 645, 646, 647, 649, 650, 651, 654, 655, 656, 659, 661; 382/162, 164, 167; 358/500, 515, 517, 518, 520, 523

[56] References Cited

U.S. PATENT DOCUMENTS

| | | | |
|---|---|---|---|
| 4,652,905 | 3/1987 | Lippel | 348/646 X |
| 4,989,080 | 1/1991 | Ito | 358/520 |
| 5,504,905 | 4/1996 | Kanamori et al. | 382/167 X |
| 5,867,286 | 2/1999 | Lee et al. | 358/523 |

FOREIGN PATENT DOCUMENTS 8-32826  2/1996  Japan ............................... H04N 1/48

OTHER PUBLICATIONS

A New Method for Color Correction in Hardcopy from CRT Images, *Journal of Imaging Science and Technology*, vol. 37, No. 1, Jan./Feb. 1993, pp. 30–35.

*Primary Examiner*—John W. Miller
*Attorney, Agent, or Firm*—Sughrue, Mion, Zinn, Macpeak & Seas, PLLC

[57] ABSTRACT

In a color correction apparatus for a color display device using 2-dimensional (2-D) chromaticity partitioning, a chromaticity plane is unevenly partitioned such that partitioned areas adjacent to each vertex of the chromaticity plane have larger areas. An area determining unit projects an input 3-D color signal onto the 2-D chromaticity plane, and outputs an index representing the location of the input color signal in the 2-D chromaticity plane. A first memory stores index values of the unevenly partitioned areas of the chromaticity plane, and outputs an index value corresponding to the index. A second memory stores transform coefficients of a matrix defining an input-output relationship of the color signal and outputs a predetermined number of transform coefficients stored in an address designated by the index value output by the first memory. A color signal operator performs a matrix-multiplication on the input color signals according to the predetermined number of transform coefficients output by the second memory, and outputs converted color signals.

9 Claims, 2 Drawing Sheets

COLOR CORRECTION METHOD AND APPARATUS USING UNEVEN TWO-DIMENSIONAL CHROMATICITY PARTITIONING

BACKGROUND OF THE INVENTION

1. Field of the Invention

The present invention relates to a color correction method in a color display device and an apparatus therefor, and more particularly, to a color correction method and apparatus using two-dimensional (2-D) chromaticity partitioning. The present application is based upon Korean Application No. 96-14711, which is incorporated herein by reference.

2. Description of the Related Art

In general, a color display device, such as a color television receiver, receives and demodulates a color signal which is produced according to a broadcast standard (e.g., NTSC or PAL) and is displayed on a cathode ray tube (CRT). However, the received color signal is distorted for various reasons. One of the main reasons is due to color signal processing in the color TV receiver. In other words, there exists a difference between an input color and an output color from the CRT due to the difference between the characteristics of the R, G, B phosphor in the CRT and those of a predetermined broadcasting standard. Also, a color deviation of intermediate colors is generated due to non-linearity of the color TV receiver circuit.

Further, an output device such as a color TV receiver sometimes requires a visual-sensitive color correction process in order to complement insufficient portions of the original colors or accommodate a difference in personal preference on colors. A color correction apparatus is an apparatus for correcting the phase and amplitude of a color signal initially input to a color display device so as to be the same as that of a final output signal.

One of the typical color correction apparatuses is disclosed in U.S. Pat. No. 4,695,875 issued Sep. 22, 1987 to Hiroyasu Kishi and entitled, "AUTOMATIC HUE CORRECTION CIRCUIT." In the apparatus, a received color signal is corrected to suit a user's taste in colors by adjusting two reference phases in a chromaticity demodulator of a color TV receiver. However, such an apparatus causes distortion of colors other than the user's desired color.

A partial color correction method using six hue areas in chromaticity is disclosed in U.S. Pat. No. 4,989,080 issued Jan. 29, 1991 to Takanori Ito and entitled, "COLOR CORRECTION DEVICE WITH A HUE AREA JUDGEMENT UNIT TO DETERMINE CORRECTION PARAMETERS." However, the partial color correction method has difficulty in carrying out the partial color correction for colors which are a mix of the primary colors.

SUMMARY OF THE INVENTION

It is an object of the present invention to provide a color correction apparatus and method for correcting a color signal distortion in view of color-sensitivity using 2-dimensional (2-D) chromaticity partitioning, and minimizing the memory use by unevenly partitioning a 2-D chromaticity plane.

To accomplish the object above, there is provided a color correction apparatus for a color display device using 2-dimensional (2-D) chromaticity partitioning, comprising: an area determining unit for projecting an input 3-D color signal onto a 2-D chromaticity plane, and outputting an index representing a location of the input color signal in the 2-D chromaticity plane, wherein the chromaticity plane is unevenly partitioned such that partitioned areas adjacent to each vertex of the chromaticity plane have larger areas; a first memory for storing index values of the unevenly partitioned areas of the chromaticity plane, and outputting an index value corresponding to the index; a second memory for storing transform coefficients of a matrix defining an input-output relationship of the color signal, and outputting a predetermined number of transform coefficients stored in an address designated by the index value output by the first memory; and a color signal operator for performing a matrix-multiplication on the input color signals according to the predetermined number of transform coefficients output by the second memory, and outputting converted color signals.

There is also provided a color correction method for a color display device using a 2-D chromaticity plane, comprising the steps of: (a) designating a partitioned area of the 2-D chromaticity plane which is partitioned into a plurality of areas according to three input color signals, wherein the chromaticity plane is unevenly partitioned such that partitioned areas adjacent to each vertex of the chromaticity plane have larger areas; (b) designating an address of a memory storing matrix transform coefficients for the designated partitioned area; (c) reading the matrix transform coefficients corresponding to the designated address of the memory; and (d) performing a matrix-multiplication of the three color signals by the read matrix transform coefficients to output three converted color signals.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE PREFERRED EMBODIMENT

Figure 1:
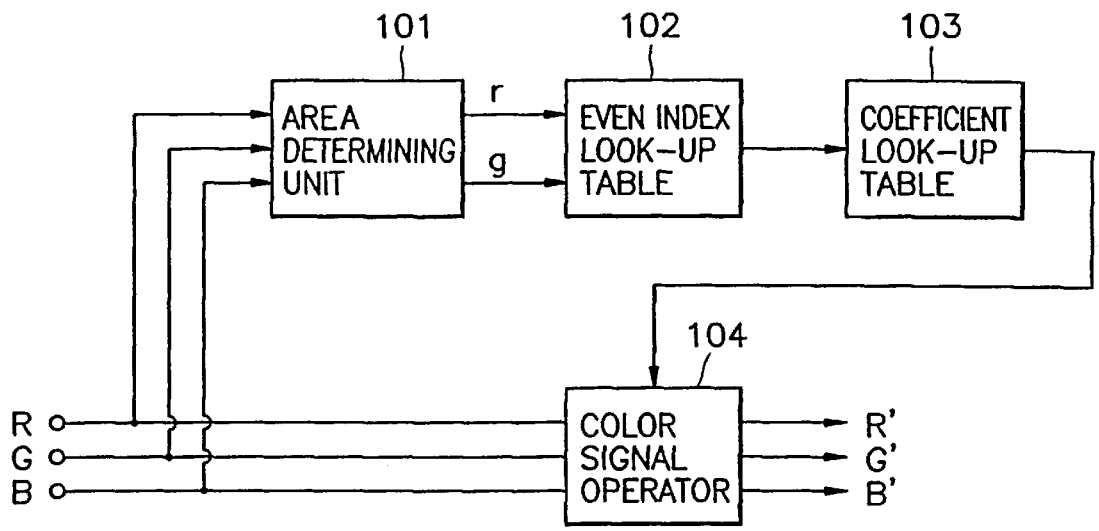
FIG. 1 is a block diagram of a color correction apparatus for comparatively illustrating the present invention.

FIG. 1 is a block diagram of a color correction apparatus, and is similar in function to a figure shown in U.S. patent application Ser. No. 08/774,653 filed Dec. 30, 1996 by Seong-Deok Lee and Chang-Yeong Kim and entitled, "COLOR PROCESSING METHOD AND APPARATUS THEREFOR USING TWO-DIMENSIONAL CHROMATICITY SEPARATION." Referring to FIG. 1, an area determining unit 101 calculates indices r and g for projecting red (R), green (G) and blue (B) signals separated from a color signal of a video signal input from a broadcast station or a VTR onto a 2-dimensional (2-D) chromaticity plane. The r and g signals output by the area determining unit 101 are indices which designate the location of the corresponding cell on the 2-D chromaticity plane (also referred to as a "chromaticity diagram") including a plurality of small cells (also referred to as a "partitioned area").

For example, an arbitrary point (R1, G1, B1), which represents a specific color, of a 3-dimensional color space can be mapped into one point (r1, g1) on a 2-D chromaticity plane according to a projection process which is represented by the following formula (1).

$$r1 = \frac{R1}{R1+G1+B1}, g1 = \frac{G1}{R1+G1+B1}. \quad (1)$$

Here, b is correlated to r and g, so that a separate operation for calculating b is not necessary. Thus, the location of the partitioned area in the chromaticity diagram shown in FIG. 2 can be designated using only r and g, while b is set to 0.

An even index look-up table 102 stores the index values calculated in the area determining unit 101. A coefficient look-up table 103 stores a matrix of transform coefficients which defines input-output relationships of the R, G and B signals and outputs a predetermined number of transform coefficients stored in the corresponding address designated by a signal output from the even index look-up table 102. A color signal operator 104 performs a matrix-multiplication of the input R, G and B signals by the transform coefficients from the coefficient look-up table 103 and outputs a converted color signal (R', G', B').

Figure 2:
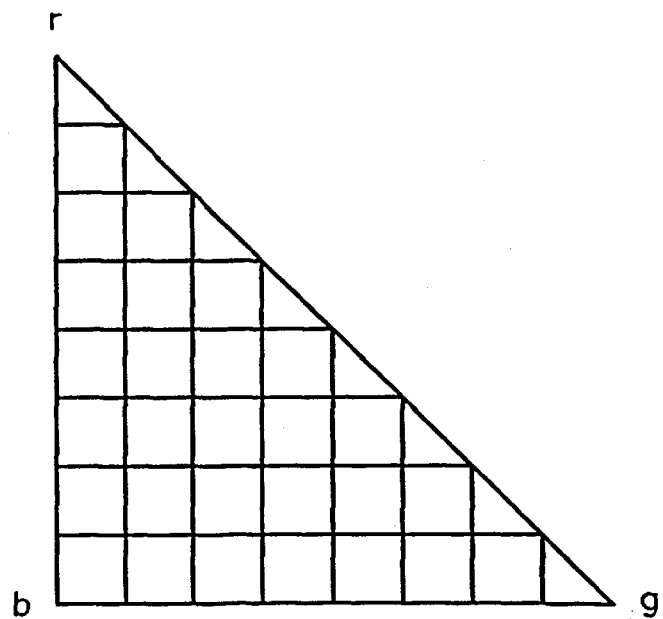
FIG. 2 is a 2-dimensional (2-D) chromaticity plane having evenly partitioned color areas, which is employed in the apparatus of FIG. 1.

However, in the color correction apparatus shown in FIG. 1, the color plane is evenly partitioned as shown in FIG. 2. Here, as the size of the partitioned area decreases, the amount of memory required for the even index look-up table 102 and the coefficient look-up table 103 increases, thereby increasing manufacturing costs.

The colors of the r, g and b vertices (i.e., primary colors R, G and B) are visually indistinguishable. The present invention reduces the memory size of the even index look-up table 102 and the coefficient look-up table 103 by assigning the same index and transform coefficients to the areas near each of the r, g and b vertices, thereby partitioning the color plane unevenly.

Figure 3:
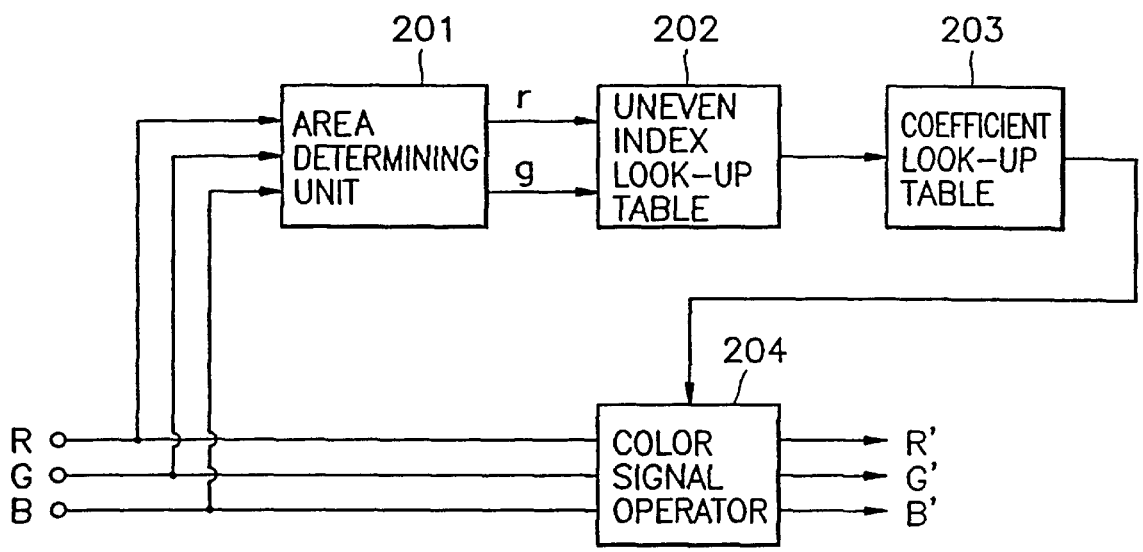
FIG. 3 is a block diagram of a color correction apparatus according to the present invention.

FIG. 3 is a block diagram of a preferred embodiment of a color correction apparatus according to the present invention. The color correction apparatus includes an area determining unit 201 for projecting the input color signal onto the 2-D chromaticity plane and outputting an index which is a coordinate representing the location of an input color signal in the chromaticity plane, an uneven index look-up table 202 for storing index values corresponding to each cell of the unevenly partitioned chromaticity plane, a coefficient look-up table 203 for storing transform coefficients for each of the index values output from the uneven index look-up table 202, and a color signal operator 204 for performing a matrix-multiplication of the input color signal by transform coefficients suitable therefor to output a corrected color signal.

The operation of the color correction apparatus shown in FIG. 3 will now be described with reference to FIG. 4. In FIG. 3, the area determining unit 201 performs an operation for projecting a 3-D color signal onto the 2-D chromaticity plane. The r and g signals output from the area determining unit 201 are index signals designating the location of each cell on the unevenly partitioned 2-D chromaticity plane shown in FIG. 4.

The color signal input to the area determining unit 201 is a (R, G, B) signal. However, in an alternative embodiment, the input color signal may be one of (Y, R-Y, B-Y), (Y, U, V) and (Y, I, Q) signals.

The uneven index look-up table 202 outputs an index value which represents an address corresponding to the r and g signals output from the area determining unit 201.

Figure 4:
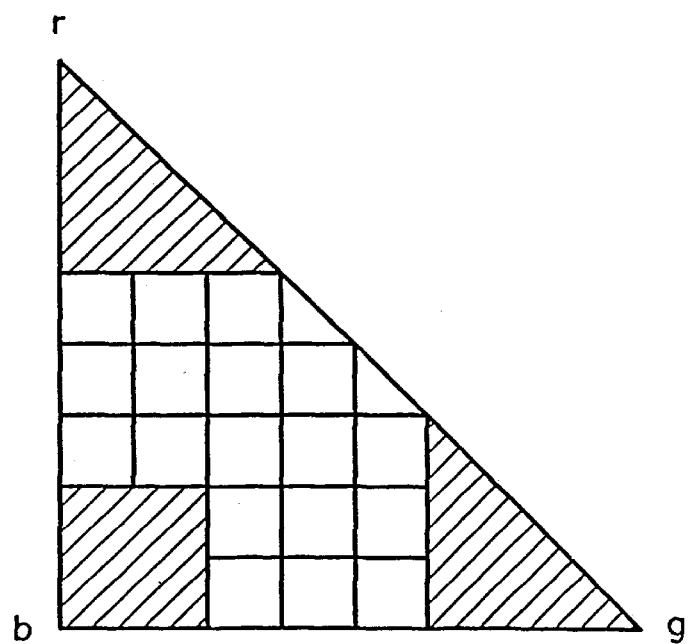
FIG. 4 is a 2-D chromaticity plane having unevenly partitioned color areas, which is employed in the apparatus of FIG. 3.

In the color correction apparatus of the present invention, the chromaticity plane is unevenly partitioned as shown in FIG. 4. That is, hatched areas near the r, g and b-axes are larger than the other areas. The uneven separation is possible since visual differences in chromaticity according to the locations of each area in the chromaticity plane cannot be distinguished in the hatched areas. The hatched areas have the primary colors R, G and B near each end of the r, g and b axes, respectively. Accordingly, the areas having the primary colors are wider than areas in which mixed colors (intermediate colors) are located.

The coefficient look-up table 203 stores transform coefficients of a matrix defining the input-output relationship of the R, G and B signals. For example, assuming that the matrix has 3 rows and 3 columns, nine coefficients are defined as a set, and the maximum number of sets available is the number of the partitioned indices. The output signal of the uneven index look-up table 202 designates the corresponding address of the coefficient look-up table 203, and the coefficient look-up table 203 outputs nine transform coefficients stored in the corresponding addresses. Here, the method for obtaining transform coefficients for each unevenly partitioned area of the 2-D chromaticity plane and the method for reducing the memory size of the coefficient look-up table 203 by grouping the transform coefficients each having similar values are described in U.S. patent application Ser. No. 08/774,653.

The color signal operator 204 performs a matrix-multiplication of the input R, G and B color signals by nine transform coefficients output by the coefficient look-up table 203, to output three converted R, G and B color signals, that is, R', G' and B'.

As described above, the color correction apparatus of the present invention partitions the 2-D chromaticity plane unevenly, so that the memory size required for the index look-up table and the coefficient look-up table is decreased, thereby lowering manufacturing costs.

While the present invention has been described and illustrated herein with reference to the preferred embodiment thereof, it will be understood by those skilled in the art that various changes in form and details may be made therein without departing from the spirit and scope of the invention.

What is claimed is:

1. A color correction method for a color display device using a 2-D chromaticity plane, comprising the steps of:
    (a) designating a partitioned area of the 2-D chromaticity plane which is partitioned into a plurality of areas according to three input color signals, wherein the chromaticity plane includes a plurality of vertices and further includes partitioned areas which are adjacent to respective ones of the plurality of vertices, and wherein the chromaticity plane includes a plurality of partitioned areas which are not adjacent to any one of the plurality of vertices, and wherein the chromaticity plane is unevenly partitioned such that partitioned areas adjacent to any one of the plurality of vertices of the chromaticity plane have larger areas than partitioned areas that are not adjacent to any one of the plurality of vertices;
    (b) designating an address of a memory storing matrix transform coefficients for the designated partitioned area;
    (c) reading the matrix transform coefficients corresponding to the designated address of the memory; and
    (d) performing a matrix-multiplication of the three color signals by the read matrix transform coefficients to output three converted color signals.

2. A color correction method as claimed in claim 1, wherein the three input color signals are selected from the group consisting of (R, G, B), (Y, R-Y, B-Y), (Y, I, Q) and (Y, U, V).

3. The color correction method of claim 1, wherein in the designating step b), an address corresponding to common data is designated for the partitioned areas that are adjacent to any one of the plurality of vertices.

4. The color correction method of claim 3, wherein in the designating step a), a three input signal comprises first, second and third color component signals which are mapped onto the 2-D chromaticity plane by assigning a first color signal of the three input color signal to a constant and determining a first ratio comprising the second color signal of the three input color signal relative to a sum of the first, second and third color signals and determining a second ratio comprising the third color signal of the three input color signal relative to the sum of the first, second, and third color signals.

5. A color correction apparatus for a color display device using 2-dimensional (2-D) chromaticity partitioning, comprising:

an area determining unit for projecting an input 3-D color signal onto a 2-D chromaticity plane, and outputting an index representing a location of the input color signal in the 2-D chromaticity plane including a plurality of vertices, wherein the chromaticity plane includes partitioned areas adjacent to respective ones of the plurality of vertices, and the chromaticity plane includes a plurality of the partitioned areas which are not adjacent to any one of the plurality of vertices, and wherein the chromaticity plane is unevenly partitioned such that the partitioned areas adjacent to one of the plurality of vertices of the chromaticity plane have larger areas than partitioned areas that are not adjacent to any one of the plurality of vertices;

a first memory for storing index values of the unevenly partitioned areas of the chromaticity plane, and outputting an index value corresponding to the index;

a second memory for storing transform coefficients of a matrix defining an input-output relationship of the color signal, and outputting a predetermined number of transform coefficients stored in an address designated by the index value output by said first memory; and a color signal operator for performing a matrix-multiplication on the input color signals according to the predetermined number of transform coefficients output by said second memory, and outputting converted color signals.

6. A color correction apparatus as claimed in claim 5, wherein said first and second memories are look-up tables.

7. A color correction apparatus as claimed in claim 5, wherein the three input color signal is selected from the group consisting of (R, G, B), (Y, R-Y, B-Y), (Y, I, Q) and (Y, U, V).

8. The color correction apparatus of claim 5, wherein said first memory stores a common index value corresponding to the partitioned areas that are adjacent to any one of the plurality of vertices.

9. The color correction apparatus of claim 8, wherein the area determining unit projects the input 3-D color signal comprising first, second and third color component signals onto the 2-D chromaticity plane by assigning a first color component signal of the 3-D color signal to a constant and determining a first ratio comprising the second color component signal relative to a sum of the first, second and third color component signals and determining a second ratio comprising the third color component signal relative to the sum of the first, second, and third color component signals.

* * * * *